United States Patent
Han et al.

(10) Patent No.: US 7,596,122 B2
(45) Date of Patent: Sep. 29, 2009

(54) APPARATUS AND METHOD FOR DATA RATE SCHEDULING OF USER EQUIPMENT IN A MOBILE COMMUNICATION SYSTEM

(75) Inventors: Jeong-Hoon Han, Seoul (KR); Young-Seok Lim, Seoul (KR); Kyung-Hyun Paik, Seoul (KR); Hun-Geun Song, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 550 days.

(21) Appl. No.: 10/983,339

(22) Filed: Nov. 8, 2004

(65) Prior Publication Data

US 2005/0117551 A1    Jun. 2, 2005

(30) Foreign Application Priority Data

Nov. 7, 2003    (KR)    ...................... 10-2003-0078756

(51) Int. Cl.
*H04Q 7/00*    (2006.01)
(52) U.S. Cl. ........................ 370/332; 370/252; 370/329; 370/437; 370/465; 370/436; 455/522; 455/450; 455/436
(58) Field of Classification Search ................. 370/437, 370/465, 252, 332, 329; 455/522, 436
See application file for complete search history.

(56) References Cited

U.S. PATENT DOCUMENTS 7,161,916 B2 *    1/2007    Malladi et al. ............... 370/332
2005/0143083 A1 *    6/2005    Kwon et al. ............. 455/452.1

FOREIGN PATENT DOCUMENTS

KR    1020020085140    11/2002

OTHER PUBLICATIONS

Dimou et al. "Performance of Uplink Packet Services in WCDMA", Apr. 22-25, 2003, IEEE,vol. 3, pp. 2071-2075.*

* cited by examiner

*Primary Examiner*—Charles N Appiah
*Assistant Examiner*—Randy Peaches
(74) *Attorney, Agent, or Firm*—Roylance, Abrams, Berdo & Goodman, LLP (57) ABSTRACT

An apparatus and method are provided for determining a data rate by means of control information in a mobile communication system which includes a User Equipment (UE) and a Node B. The UE transmits data to the Node B, and the Node B transmits the control information to the UE. The data rate is determined by means of the control information and is used for transmission of the data by the UE. The apparatus and method comprise determining a preliminary data rate in consideration of a quantity of data waiting for transmission; comparing the preliminary data rate with a previous data rate used for previous data transmission; and determining the data rate according to a result of comparison so that the UE can transmit the data at the data rate.

24 Claims, 12 Drawing Sheets

APPARATUS AND METHOD FOR DATA RATE SCHEDULING OF USER EQUIPMENT IN A MOBILE COMMUNICATION SYSTEM

PRIORITY

This application claims the benefit under 35 U.S.C. 119(a) of an application entitled "apparatus and method for data rate scheduling of user equipment in mobile communication system" filed in the Korean Industrial Property Office on Nov. 7, 2003 and assigned Serial No. 2003-78756, the entire contents of which are incorporated herein by reference.

BACKGROUND OF THE INVENTION

1. Field of the Invention

The present invention relates to data transmission of a mobile communication system. More particularly, the present invention relates to an apparatus and a method for scheduling a data rate at which a user equipment (UE) transmits data to a Node B.

2. Description of the Related Art

A mobile communication system is a general term for systems providing voice, data, or other types of information through a wireless network. The mobile communication systems can be classified according to multiplexing schemes used, an example of which is a Code Division Multiple Access (CDMA) mobile communication system which provides wireless mobile communication service using a CDMA scheme. For the CDMA mobile communication system, an IS-95 standard mainly for transmission/reception of voice signals was initially developed and an IMT-2000 standard for transmission of not only voice signals but also high speed data is now being discussed. Specifically, the IMT-2000 standard provides services such as high quality voice reproduction, dynamic image reproduction, Internet access service, etc.

In the CDMA mobile communication system, the same frequency band is used by multiple users, and multiplexing is implemented by spreading data by means of a specific code for each of the multiple users. An increase in the data transmission speed of a UE of each of the multiple users implies an increase in transmission power, and the transmission power increase may serve as an interference factor to other UEs. Therefore, it is necessary to discuss a method for reducing the interference factor by scheduling the data transmission speed of the UE.

In a network of the existing 2G or 3G mobile communication system, when a new UE accesses the network, a maximum data transmission speed allowable to the UE is determined in consideration of a reception signal level and noise rise of each UE and is reported to the newly accessed UE. Then, the UE sets the transmission speed in consideration of the reported maximum data transmission speed, the quantity of data to be transmitted, and priorities of the data. The UE transmits the data at the set transmission speed.

Figure 1:
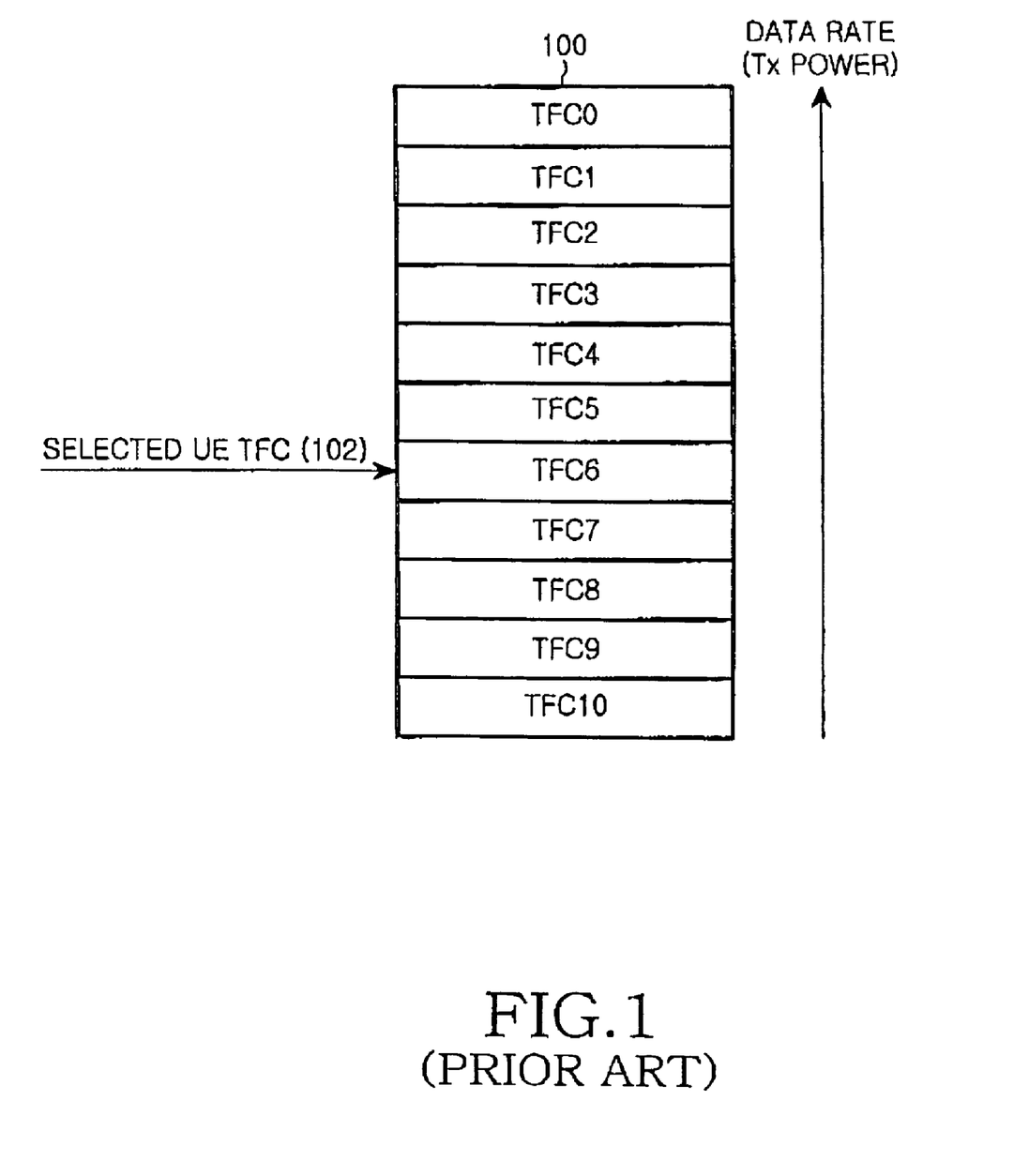
FIG. 1 illustrates a structure of a conventional Transport Format Combination Set (TFCS)

FIG. 1 illustrates a Transport Format Combination Set (TFCS) generated using interference levels of multiple Node Bs measured by a Radio Network Controller (RNC) and transmitted to each UE. The TFCS contains data transmission speed which is allowed for each UE receiving the TFCS. The TFCS includes Transport Format Combination (TFC) 0 through TFC10. TFC0 represents the highest data transmission speed and TFC10 represents the lowest data transmission speed. The UE selects a TFC in consideration of the received TFCS, buffer occupancy, and maximum transmit power Max_Tx_Pwr. FIG. 1 shows the UE's selection of TFC6 as indicated by arrow 102. As described above, the data transmission speed of the UE is determined through scheduling by the UE itself based on the received TFCS.

When the UE spontaneously determines the TFC, the RNC inevitably takes a long time to reflect a rise in noise of the Node B. The longer the time taken by the RNC in reflecting the rise in noise of the Node B which changes instantaneously, the more difficult it is to precisely reflect the rise in noise in the TFCS to be transmitted to a UE newly accessing a Node B controlled by the RNC.

Further, packet data having a burst data transmission characteristic has a larger noise rise dispersion than that of voice data, so the noise rise of the Node B shows an increased variance (i.e., dispersion).

Figure 2:
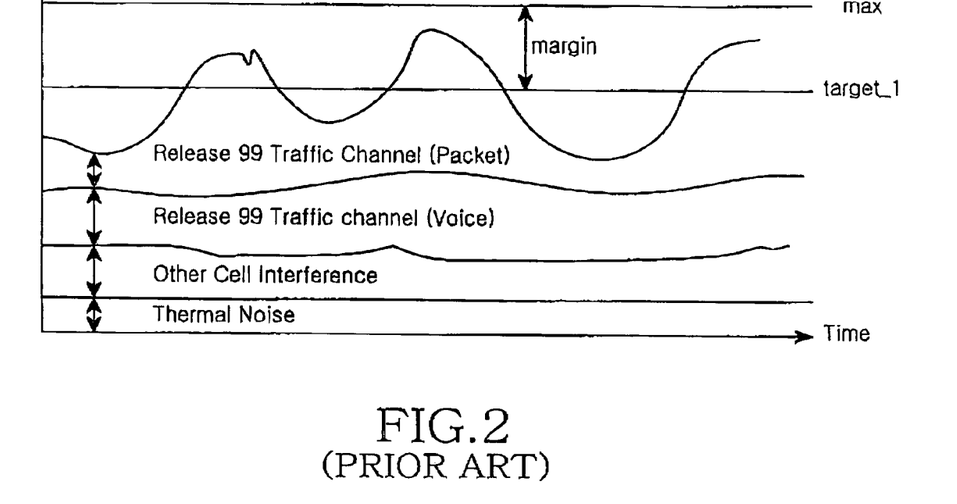
FIG. 2 illustrates various interference signals generated in a conventional mobile communication system.

FIG. 2 illustrates noise rise variance of the Node B according to time.

As shown in FIG. 2, the interference elements of the Node B are classified into thermal noise, interference of other Node Bs, interference by a voice channel, and interference on a packet channel. Variance in the thermal noise, the interference of other Node Bs, and the interference by a voice channel according to the passage of time are either predictable or very little. However, it should be noted that the interference on a packet channel has a large variance according to time. That is, it should be noted that most of the noise rise variance of the Node B is determined by the variance of the interference on a packet channel. In FIG. 2, 'max' signifies a maximum allowable interference level and 'target_1' signifies a target interference level reflecting variance of the interference level according to time. Also, 'margin' signifies the difference between the maximum allowable interference level and the target interference level. The 'margin' is determined according to the variance of the interference level. In other words, because the sum of the noise rise is not allowed to exceed the value 'max' in performing the scheduling, the 'margin' must be increased in proportion to the noise rise variance when the noise rise has a large variance. Therefore, an increase in the variance of the interference level causes an increase of the margin and a decrease in the variance of the interference level causes a decrease of the margin. However, a mobile communication system creates a large amount of interference with a packet channel, which causes a large variance in the interference level, thereby increasing the 'margin'.

As described above, each UE determines by itself the data transmission speed, thereby increasing the noise rise variance and accordingly increasing the margin. This implies that the power which the Node B can assign for use of each UE for data transmission is reduced according to an increase of the 'margin'. That is, as the 'margin' increases, inefficient use of radio resources increase. FIG. 2 also shows inefficient use of radio resources.

Hereinafter, the noise rise will be discussed. The noise rise can be expressed as shown in the following equation (1).

$$\text{Noise\_rise} = \frac{I_{or} + I_{oc} + N_t}{N_t} \quad (1)$$

In equation (1), $I_{or}$ represents the power of reception signals transmitted from UEs located in a particular cell, $I_{oc}$ represents the power of reception signals transmitted from UEs located in another cell, and $N_t$ represents the power of noise.

Figure 3:
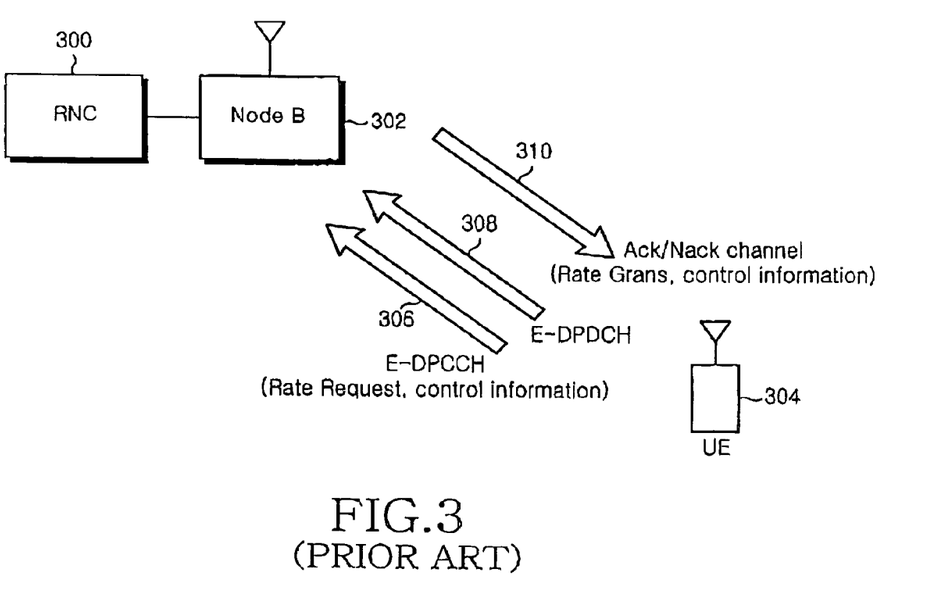
FIG. 3 is a block diagram for illustrating a conventional signaling between a User Equipment (UE) and a Node B in order to reduce interference signals.

FIG. 3 is a block diagram illustrating a general form of uplink data transmission from a UE to a Node B. The system shown in FIG. 3 includes an RNC 300, a Node B 302, and a UE 304.

The UE 304 requests a data rate and control information to the Node B 302 through an Enhanced Dedicated Physical Control Channel (E-DPCCH) as shown by arrow 306. The Node B 302 transmits the control information at a determined data rate in response to the request of the UE 304 as shown by arrow 310. Specifically, the control information and the data rate are determined by the RNC 300 and are then transmitted to the Node B 302 and then to the UE 304. The UE 304 transmits data by means of the received data rate and the control information as shown by arrow 308. Herein, the data is transmitted through an Enhanced Dedicated Physical Data Channel (E-DPDCH).

Figure 4:
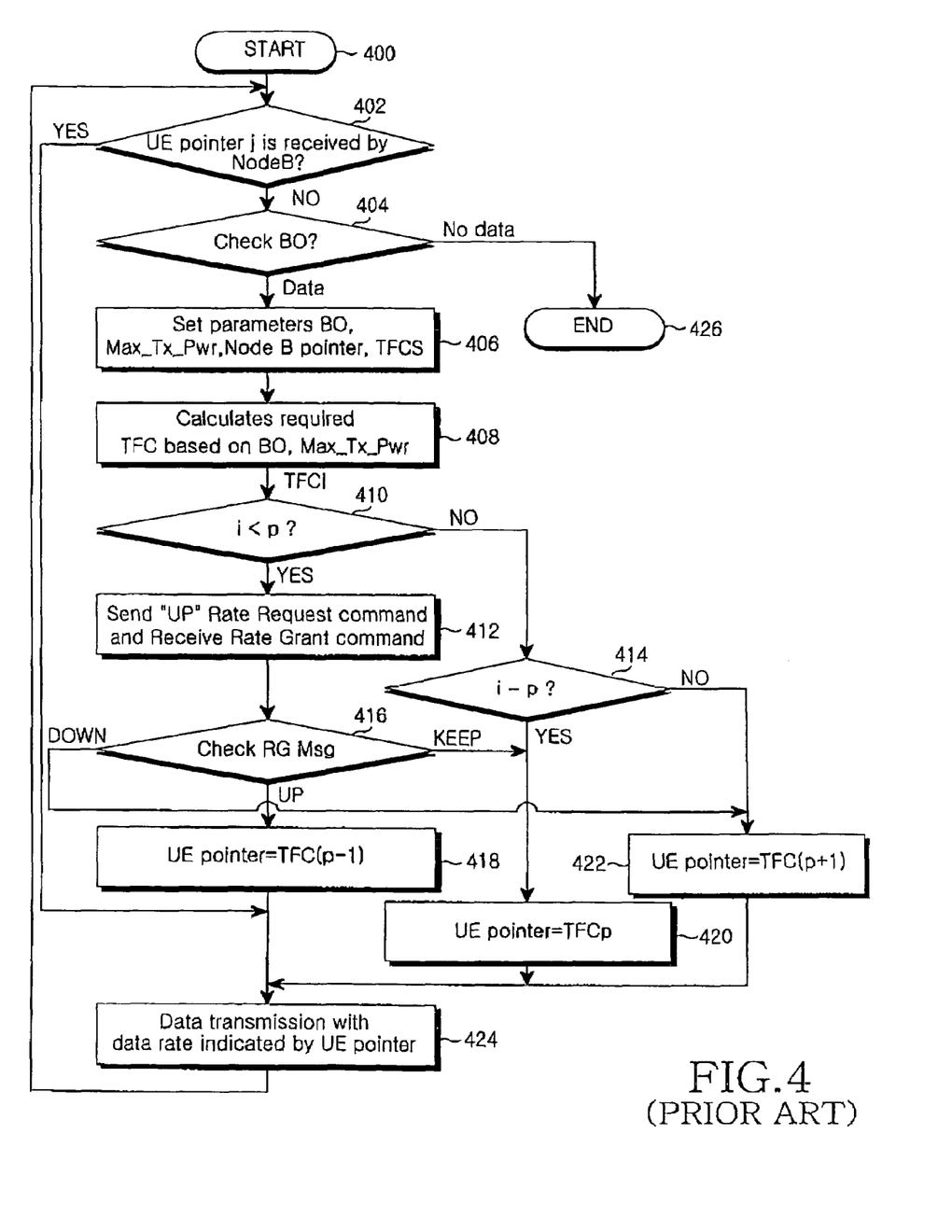
FIG. 4 is a flowchart of a conventional process for determining a data rate in a UE.

FIG. 4 illustrates a process in which a UE selects a TFC.

In step 402, the UE determines whether a UE pointer j has been received from the Node B or not. When the UE pointer j has been received, step 424 is executed. When the UE pointer j has not been received, step 404 is executed. Hereinafter, a Node B pointer and the UE pointer j will be described with reference to FIG. 5. The Node B pointer 502 refers to a TFCS assigned and transmitted to a particular Node B belonging to a cell controlled by an RNC. The UE pointer j 504 refers to a TFC which the Node B assigns to the UE in consideration of the TFCS transferred from the RNC and a received interference level, etc. Usually, the UE transmits data by means of the UE pointer j at an initial stage of transmission. Therefore, at the initial stage of transmission, the UE proceeds to step 404 from step 402.

In step 404, the UE checks the buffer. If the buffer contains data to transmit, the UE proceeds to step 406. If the buffer contains no data to transmit, the UE proceeds to step 426 and ends the process. In step 406, the UE sets the buffer occupancy, the maximum transmission power, the Node B pointer 502, and TFCS. Although not shown in FIG. 4, the UE transmits at the initial stage of transmission the data stored in the buffer by means of the data rate corresponding to the TFC indicated by the received UE pointer j.

Figure 5:
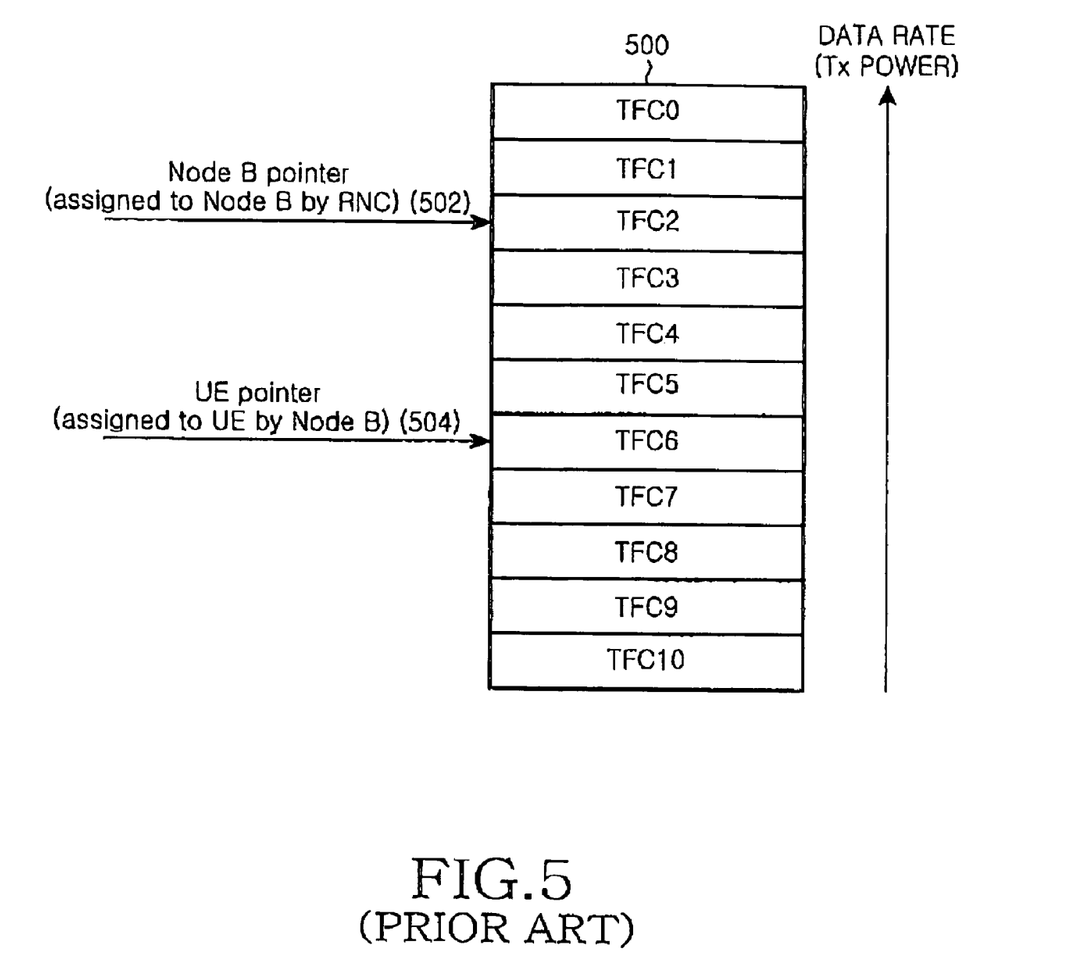
FIG. 5 illustrates a structure of a TFCS transmitted to the UE shown in FIG. 4.

In step 408, the UE checks the buffer occupancy at a particular time interval in the course of the data transmission. According to the quantity of the data stored in the buffer, the UE may report the quantity to the Node B. The UE determines an optimum data rate in consideration of the maximum transmission power and the quantity of the data stored in the buffer. Further, the UE selects a TFC corresponding to the determined data rate from the TFCS. The selected TFC is set as TFCi. Referring to FIG. 5, i has one value from among 0 through 10.

In step 410, the UE compares the TFC corresponding to the data rate of current transmission with the TFC selected in step 408. In step 410, p refers to a level of the TFC corresponding to the data rate of the current transmission. Referring to FIG. 5, p has one value from among 2 through 10. The reason why p cannot have a value of 0 or 1 is that data cannot be transmitted at a higher data rate than the data rate assigned to the Node B. As a result of the comparison, the UE proceeds to step 412 if i is larger than p and proceeds to step 414 if i is not larger than p.

In step 412, the UE requests the Node B to assign a data rate that is one step higher and receives a response to the request. In consideration of the reception interference level, the Node B determines whether or not to perform assignment of the data rate requested by the UE. In step 416, the UE determines the response from the Node B. According to the result of the determination, the UE performs step 422 when information "DOWN" has been received and performs step 420 when information "KEEP" has been received. The UE performs step 418 when information "UP" has been received.

In step 414, the UE compares i and p. According to the result of the comparison, the UE performs step 420 when i and p are equal and performs step 422 when i and p are not equal.

In step 418, the UE replaces the current TFC by a new TFC one step higher than the current TFC. In step 418, the UE maintains the current TFC. In step 422, the UE replaces the current TFC by a new TFC one step lower than the current TFC. Table 1 shows an example of the result by the process from step 418 to step 422.

TABLE 1

| Current TFC | Step 418 | Step 420 | Step 422 |
|---|---|---|---|
| TFC 6 | TFC 5 | TFC 6 | TFC 7 |

In step 424, the UE transmits the data stored in the buffer at the data rate corresponding to the TFC set in one of steps 418, 420, and 422. As shown in FIG. 4, the UE requests data rate assignment to the Node B only when the UE wants a higher data rate than a current data rate and does not request data rate assignment to the Node B when the UE wants a lower data rate than the current data rate.

Figure 6:
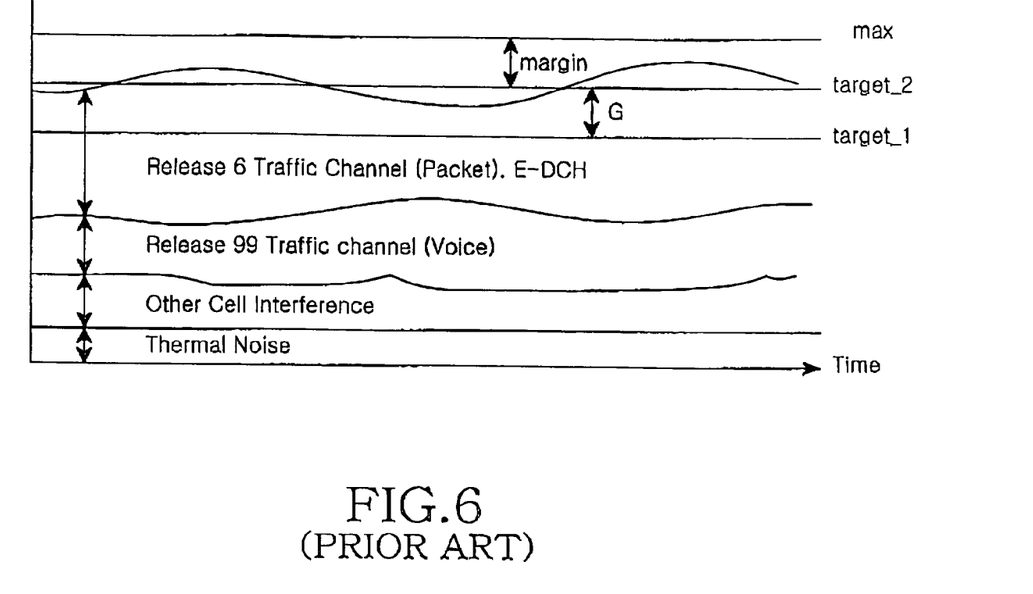
FIG. 6 is a graph for illustrating reduction of the interference signals through the conventional signaling between the UE and the Node B.

FIG. 6 illustrates variance in reception interference of the Node B according to the process shown in FIG. 4. As shown in FIG. 4, the data rate variance is adjusted with reference to one level, so that the variance becomes less abrupt and fluctuating. Therefore, as opposed to FIG. 1, FIG. 6 shows 'margin' with a reduced width. The reduction of the 'margin' increases the target interference level target_2, thereby enabling efficient use of radio resources. 'G' in FIG. 6 represents the difference between target_1 and target_2.

In the conventional system as described above, a radio resource is assigned for signaling between the UE and the Node B, thereby causing capacity reduction of the system and causing time delay due to the signaling transmission. Further, because scheduling is necessary in order to assign radio resources to a plurality of UEs, the Node B has an increased complexity. Therefore, a solution for solving the above-described problems is highly required.

SUMMARY OF THE INVENTION

Accordingly, the present invention has been made to solve the above-mentioned problems occurring in the prior art, and an object of the present invention is to provide an apparatus and a method for reducing interference signals in Node B.

It is another object of the present invention to provide an apparatus and a method for efficiently assigning a radio resource used for signaling between a User Equipment (UE) and a Node B, thereby preventing capacity reduction of a system.

It is another object of the present invention to provide an apparatus and a method for preventing time delay due to the signaling between a UE and a Node B.

It is another object of the present invention to provide an apparatus and a method for reducing the complexity of a Node B performing scheduling for distribution of radio resources within a particular duration.

In order to accomplish this object, there is provided a method for determining a data rate by means of control information in a mobile communication system which includes a UE and a Node B. The UE transmits data to the Node B, and the Node B transmits the control information to the UE. The data rate is determined by means of the control information and used for transmission of the data by the UE. The method comprising the steps of determining a preliminary data rate in consideration of a quantity of data waiting for transmission; comparing the preliminary data rate with a previous data rate used for previous data transmission; and determining the data rate according to a result of comparison so that the UE can transmit the data at the data rate.

In accordance with another aspect of the present invention, there is provided an apparatus for determining a data rate by means of control information in a mobile communication system. The data rate is determined by means of the control information and used for transmission of data by the UE. The apparatus comprising a UE for transmitting the data to the Node B, the UE determining a preliminary data rate in consideration of a quantity of data waiting for transmission, comparing the preliminary data rate with a previous data rate used for previous data transmission, and determining the data rate according to a result of comparison so that the UE can transmit the data at the data rate; and a Node B for transmitting the control information to the UE.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, embodiments of the present invention will be described with reference to the accompanying drawings. In the following description, a detailed description of known functions and configurations incorporated herein will be omitted for conciseness.

Figure 7:
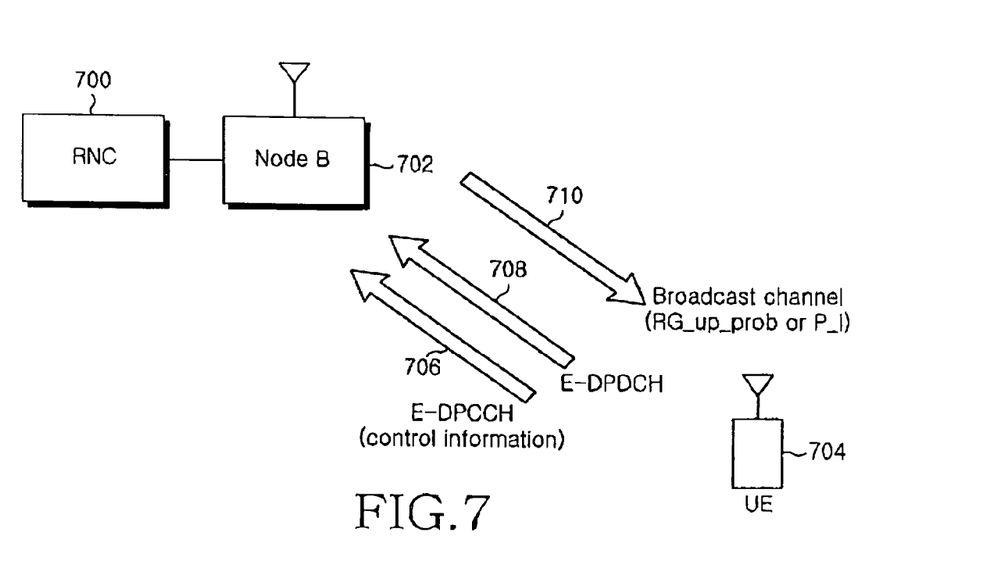
FIG. 7 is a block diagram for illustrating a signaling between a UE and a Node B according to an embodiment of the present invention.

FIG. 7 is a block diagram for illustrating uplink data transmission from a User Equipment (UE) to a Node B according to an embodiment of the present invention. The system shown in FIG. 7 includes an Radio Network Controller (RNC) 700, a Node B 702, and a UE 704. Although a mobile communication system may include further elements to the above-mentioned ones, only the necessary elements for practicing an embodiment of the present invention as shown in FIG. 7 are discussed here. In the following description, the signaling between the Node B 701 and the UE 704 is mainly discussed.

The UE 704 requests control information to the Node B 702 through an Enhanced Dedicated Physical Control Channel (E-DPCCH) as shown by arrow 706. Here, as opposed to the case shown in FIG. 3, the UE 704 does not request the data rate but requests only the control information.

The Node B 702 transmits the requested control information to the UE 704 through a broadcast channel as shown by arrow 710. The control information transmitted to the UE 704 through the broadcast channel includes information for controlling uplink transmission speed (i.e., data rate) of the UE 704. In other words, the UE 704 transmits uplink data through Enhanced Dedicated Physical Data Channel (E-DPDCH) as shown by arrow 708 by using the control information transmitted from the Node B 702 for the uplink data transmission. Hereinafter, the information transmitted through the broadcast channel will be referred to as a rate grant probability RG_up_prob or P_i. The rate grant probability is not transmitted at a regular time interval but is transmitted only when the Node B 702 has an increased traffic load. Therefore, the Node B 702 can reduce both the load on the Node B 702 and the interference between the multiple UEs within the Node B 702 by transmitting the rate grant probability. Specifically, in transmitting the rate grant probability, the Node B 702 may set the rate grant probability to have a small value when the traffic load increases and a large value when the traffic load decreases.

Figure 8:
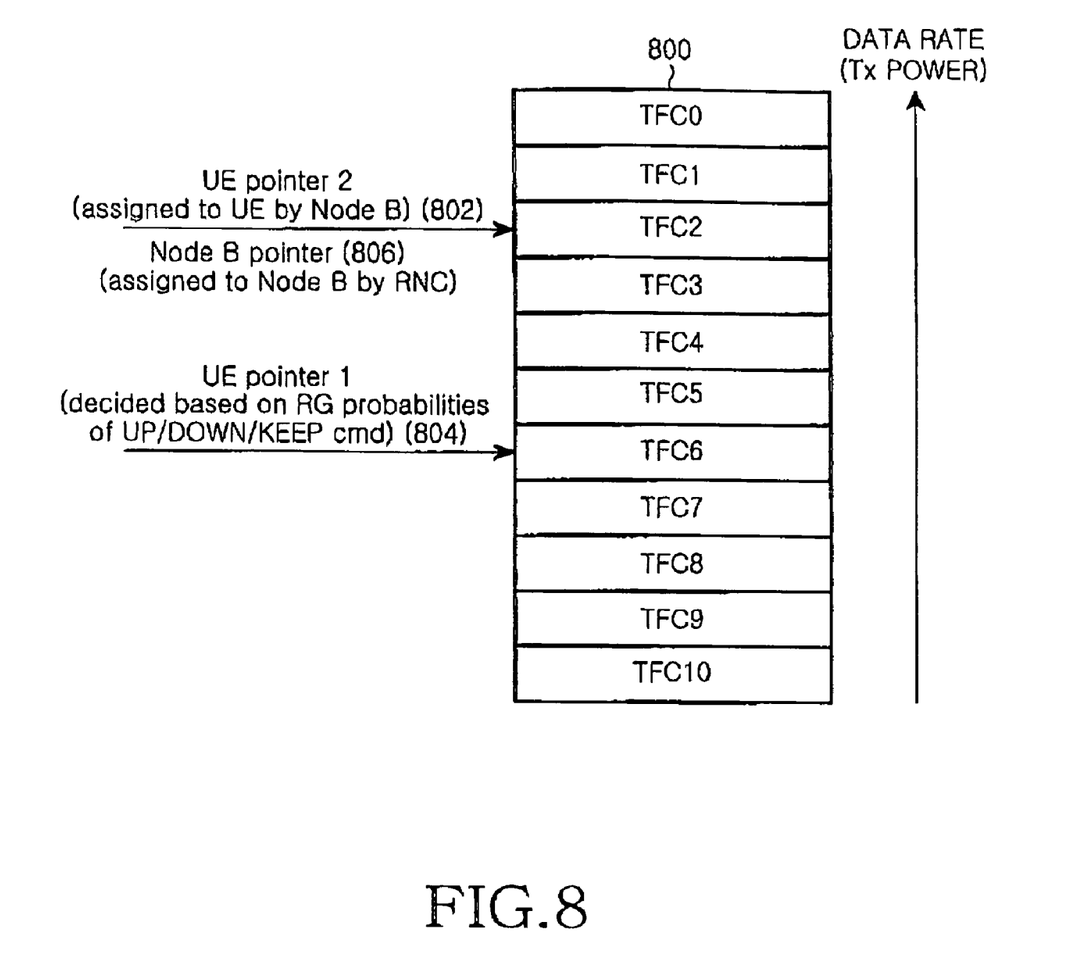
FIG. 8 illustrates a structure of a TFCS according to the first embodiment of the present invention.

FIG. 8 illustrates a structure of a Transport Format Combination Set (TFCS) according to a first embodiment of the present invention. Hereinafter, the structure of a TFCS according to a first embodiment of the present invention will be described in detail with reference to FIG. 8. The TFCS 800 includes TFC0 through TFC10. TFC0 represents the highest data rate and TFC10 represents the lowest rate. Although the TFCS shown in FIG. 8 employs TFCs in 11 steps, more steps of TFCs may be employed.

The Node B pointer 806, which is information transmitted to the Node B by the RNC refers to a maximum data rate for the Node B, determined from a measurement of noise rise of the multiple Node Bs by the RNC. The Node B determines a UE pointer 2 (802) with reference to the Node B pointer 806 and transmits the determined UE pointer 2 to the UE. The UE pointer 2 implies a maximum data rate at which the UE can transmit data. The UE pointer 2 is assigned to the UE by the Node B in consideration of the noise rise of the Node B, etc. FIG. 8 shows that the Node B pointer 806 and the UE pointer 2 (802) are set as TFC2.

A UE pointer 1 (804) is determined by the UE using the information transmitted from the Node B and used in actual transmission of data. Referring to FIG. 8, the UE transmits data by means of one TFC from among TFC2 through TFC10, i.e., TFC6, which has been determined based on the Node B pointer 806 and the UE pointer 2 (802) transmitted from the Node B.

In other words, in the first embodiment of the present invention, the UE determines the TFC based on the information transmitted from the Node B, as opposed to what is done in the prior art.

Figure 9:
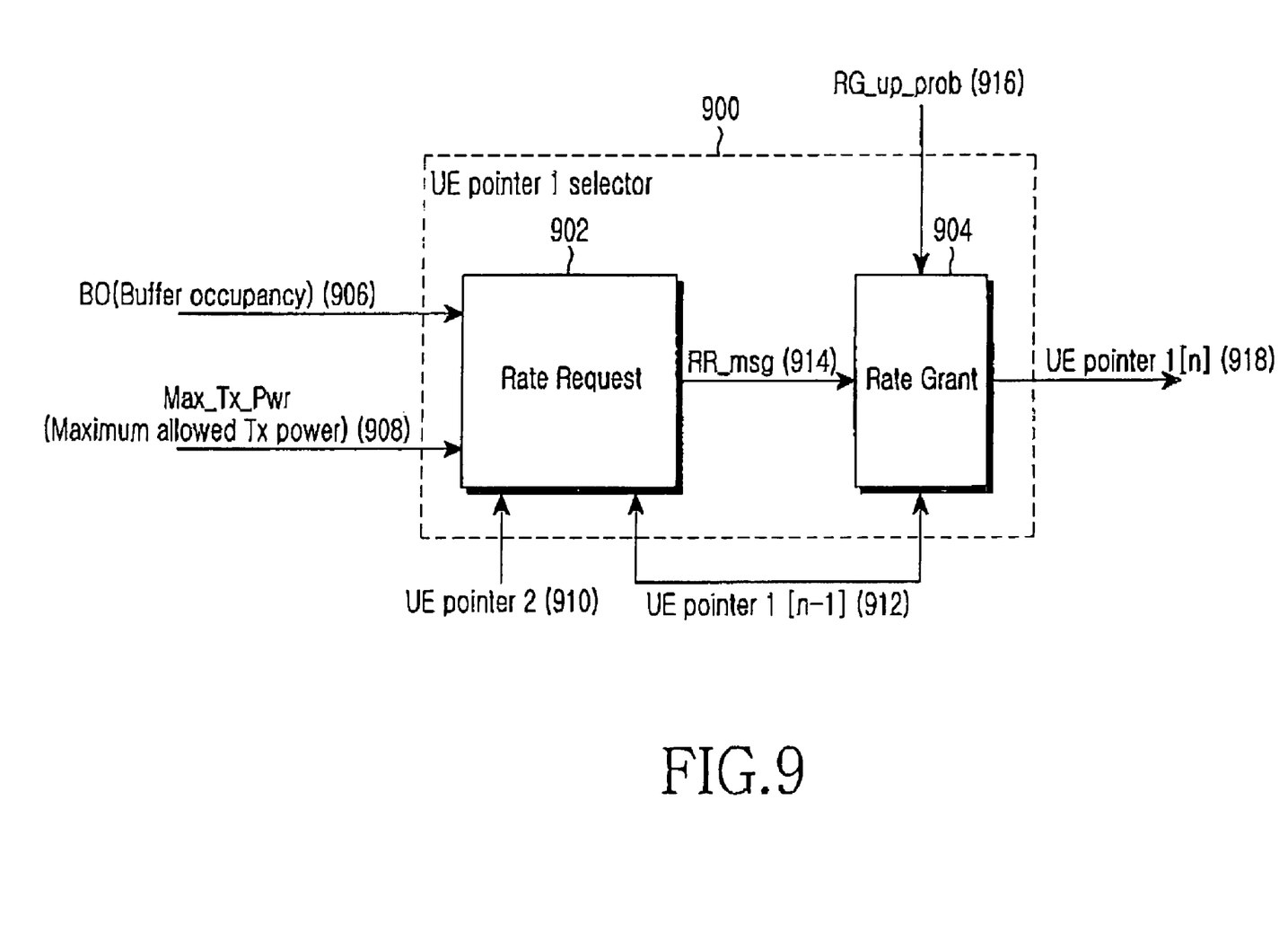
FIG. 9 is a block diagram for illustrating a structure of a UE determining a data rate according to the first embodiment of the present invention.

FIG. 9 is a block diagram showing a construction of a UE pointer 1 selection unit of the UE according to the first embodiment of the present invention.

Referring to FIG. 9, the UE pointer 1 selection unit 900 includes a rate request unit 902 and a rate grant unit 904. The rate request unit 902 determines the data rate necessary for the UE and the rate grant unit 904 detects whether the data rate determined by the rate request unit 902 is available or not.

The rate request unit 902 receives a Buffer Occupancy (BO) 906, a maximum allowed transmission power 908, and the UE pointer 2 (910) from the Node B, and calculates an optimum data rate based on the received information. In calculating the optimum data rate, an optimum TFC is selected using the TFCS, i.e., the UE pointer 2. In other words, the rate request unit 902 selects a higher data rate or a data rate of a higher level when the buffer contains large data. However, when the requested data rate exceeds the maximum allowed transmission power 908 for the UE, the rate request unit 902 determines the data rate within a range satisfying the condition of maximum allowed power 908. Further, the TFC determined in this way is compared with the UE pointer 2 transmitted from the Node B, so that the finally selected TFC cannot exceed the range limited by the UE pointer 2. The TFC selection proposed above is only one example of various possible methods and can be obviously modified or changed in various ways in its actual application.

Then, the rate request unit 902 compares the determined TFC with the UE pointer 1 [n-1] 912. From the result of the comparison, the rate request unit 902 outputs "UP" when the determined TFC is higher than the TFC of the previous transmission and outputs "DOWN" when the determined TFC is lower than the TFC of the previous transmission. Further, the rate request unit 902 outputs "KEEP" when the determined TFC is equal to the TFC transmitted at the previous time. Hereinafter, each of the output "UP", "KEEP", and "DOWN" will be referred to as a rate request message 914.

The data rate request message 914 is transmitted to the rate request unit 904. The rate request unit 904 receives a rate grant probability message 916 from the Node B as well as the data rate request message 914 and the UE pointer 1[n-1] 912 used at the previous time from the rate request unit 902. The rate grant probability message 916 has a value between 0 and 1. The rate grant unit 904 outputs the UE point 1 (918) at the current time by using the received information. Here, the rate grant unit 904 may generate a random variable between 0 and 1, output the received UE pointer 1[n] 918 only when the generated random variable is smaller than the received rate grant probability message 916, and output the previously used UE pointer 1[n-1] intact when the generated random variable is not smaller than the received rate grant probability message 916.

Figure 10:
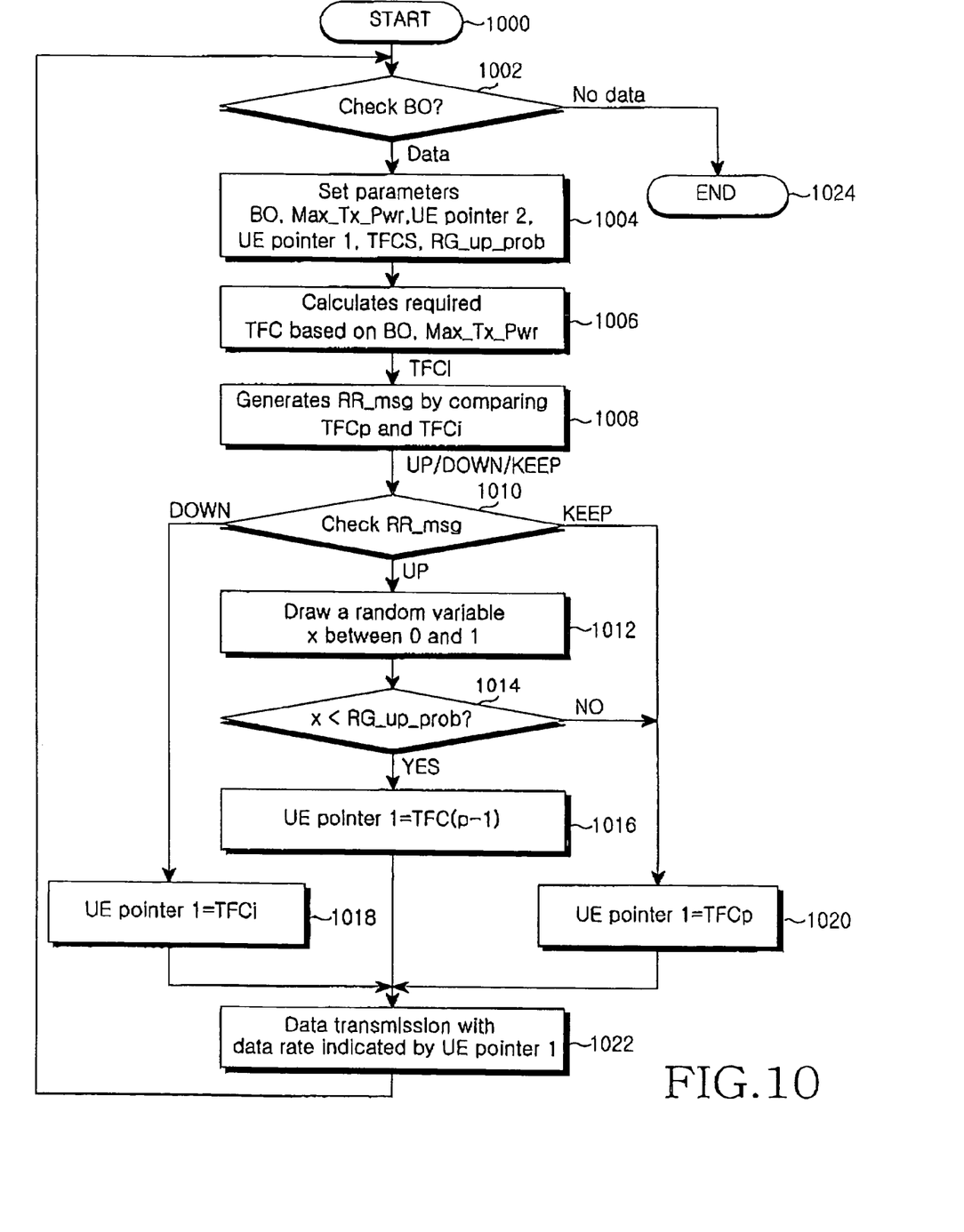
FIG. 10 is a flowchart of an operation of a UE according to the first embodiment of the present invention.

Hereinafter, a process of outputting the UE pointer 1 (918) at the current time will be described in detail with reference to FIG. 10.

First, in step 1002, the UE checks the buffer occupancy. If the buffer contains data to transmit, the UE proceeds to step 1004. If the buffer contains no data to transmit, the UE proceeds to step 1024 and ends the process. In step 1004, the UE sets the buffer occupancy, the maximum allowable transmission power, the UE pointer 2, the UE pointer 1, TFCS, and the rate grant probability message. In step 1006, the UE calculates an optimum data rate by means of the buffer occupancy, the maximum allowable transmission power, and the UE pointer 2. The calculated data rate is used in selecting a TFC for transmission of data using the UE pointer 2. In FIG. 10, the selected TFC is expressed as TFCi.

In step 1008, the UE compares TFCi with TFCp corresponding to the data rate of previous transmission. "UP" is output when TFCi is higher than TFCp and "KEEP" is output when TFCi is equal to TFCp. "DOWN" is output when TFCi is lower than TFCp. As described above, "UP", "KEEP", and "DOWN" are referred to as Rate Request (RR) messages. In step 1010, the RR message is checked. When the RR message is "UP", the UE performs step 1012. When the RR message is "KEEP", the UE proceeds to step 1020 and transmits data at TFCp corresponding to the data rate of the previous data transmission. In contrast, when the RR message is "DOWN", the UE proceeds to step 1018 in which the UE pointer 1 is determined as the TFCi selected in step 1006.

When an RR message of "UP" is received in step 1012, the UE generates a random variable x between 0 and 1 with a uniform generation probability. In step 1014, the UE compares the rate grant probability message with the variable x generated in step 1012. When the variable x is smaller than the rate grant probability message, step 1016 is performed. When the variable x is larger than or equal to the rate grant probability message, step 1020 is performed. In step 1016, the UE determines the UE pointer 1 as TFC(p-1). That is, the UE selects a TFC one step higher than the previously used TFC. In step 1020, the UE determines the UE pointer 1 as the same TFC as that used in the previous time. In step 1022, the UE transmits data by means of TFC corresponding to the determined UE pointer 1.

Hereinafter, a structure of a TFCS according to a second embodiment of the present invention will be described in detail with reference to FIG. 11.

Figure 11:
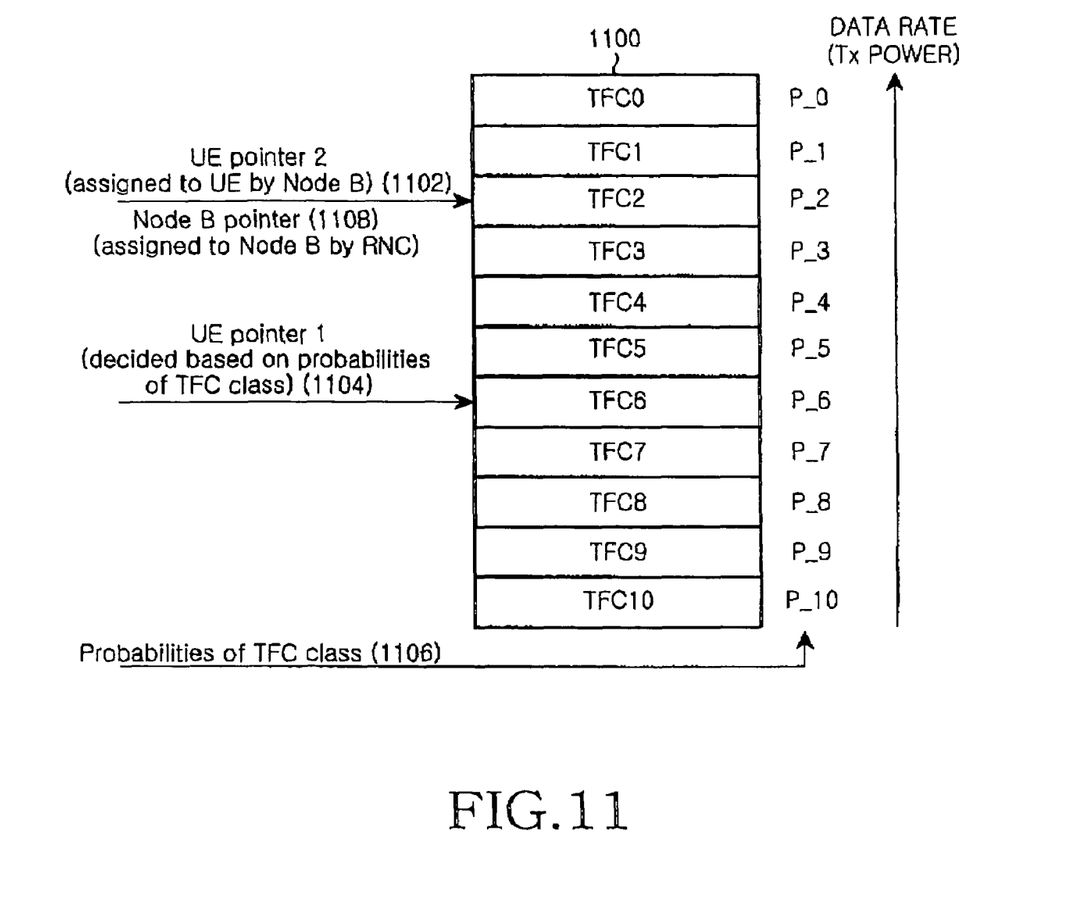
FIG. 11 illustrates a structure of a TFCS according to a second embodiment of the present invention.

The TFCS 1100 shown in FIG. 11 includes TFC0 through TFC10. TFC0 represents the highest data rate and TFC 10 represents the lowest rate. Although the TFCS shown in FIG. 11 employs TFCs in 11 steps, more steps of TFCs may be employed.

The Node B pointer 1108 is transmitted to the Node B by the RNC and is a value determined based on the measurement of the noise rise in multiple Node Bs by the RNC. The UE pointer 2 transmitted from the Node B to the UE implies a maximum data rate at which the UE can transmit data. That is, the UE pointer 2 (1102) is assigned to the UE by the Node B in consideration of the noise rise of the Node B, etc. FIG. 11 shows that the Node B pointer 1108 and the UE pointer 2 (1102) are set as TFC2.

A UE pointer 1 (1104) is determined by the UE based on the information transmitted from the Node B and is used in actual transmission of data. Referring to FIG. 11, the UE transmits data by means of one TFC selected from among TFC2 through TFC10 based on the Node B pointer 1108 and the UE pointer 2 (802) transmitted from the Node B. Specifically, the UE transmits data by means of TFC6 in FIG. 11. In other words, in the second embodiment of the present invention, the UE determines the TFC based on the information transmitted from the Node B, as opposed to how it is performed in the prior art.

Further, the TFC corresponds to an identifier having a particular probability. In FIG. 11, the identifier having a particular probability is expressed as P_i(1106). The identifier P_i(106) includes P_0 corresponding to TFC0 and P_10 corresponding to TFC10. The probability implies a grant probability of the data rate requested by the UE. Therefore, the UE determines whether to transmit data or not by means of a new data rate calculated using the requested data rate and the grant probability.

The probability for the TFC is determined in consideration of the data rate allowable for the UE and the interference quantity of the Node B. Usually, P_i of a higher TFC having a lower data rate is set to be higher and P_i of a lower TFC having a higher data rate is set to be lower. For example, P_0 through P_5 may be set to have a probability of 0.2 and P_6 through P_10 may be set to have a probability of 1. As another example, P_0 may be set to have a probability of 0.1, P_1 may be set to have a probability of 0.2, P_2 may be set to have a probability of 0.3, and P_3 through P_10 may be set to have a probability of 1. Correlation between TFCi and P_i may be contained in a table stored in advance between the Node B and the UE in order to reduce signaling between the UE and an upper layer or between the Node B and an upper layer.

Figure 12:
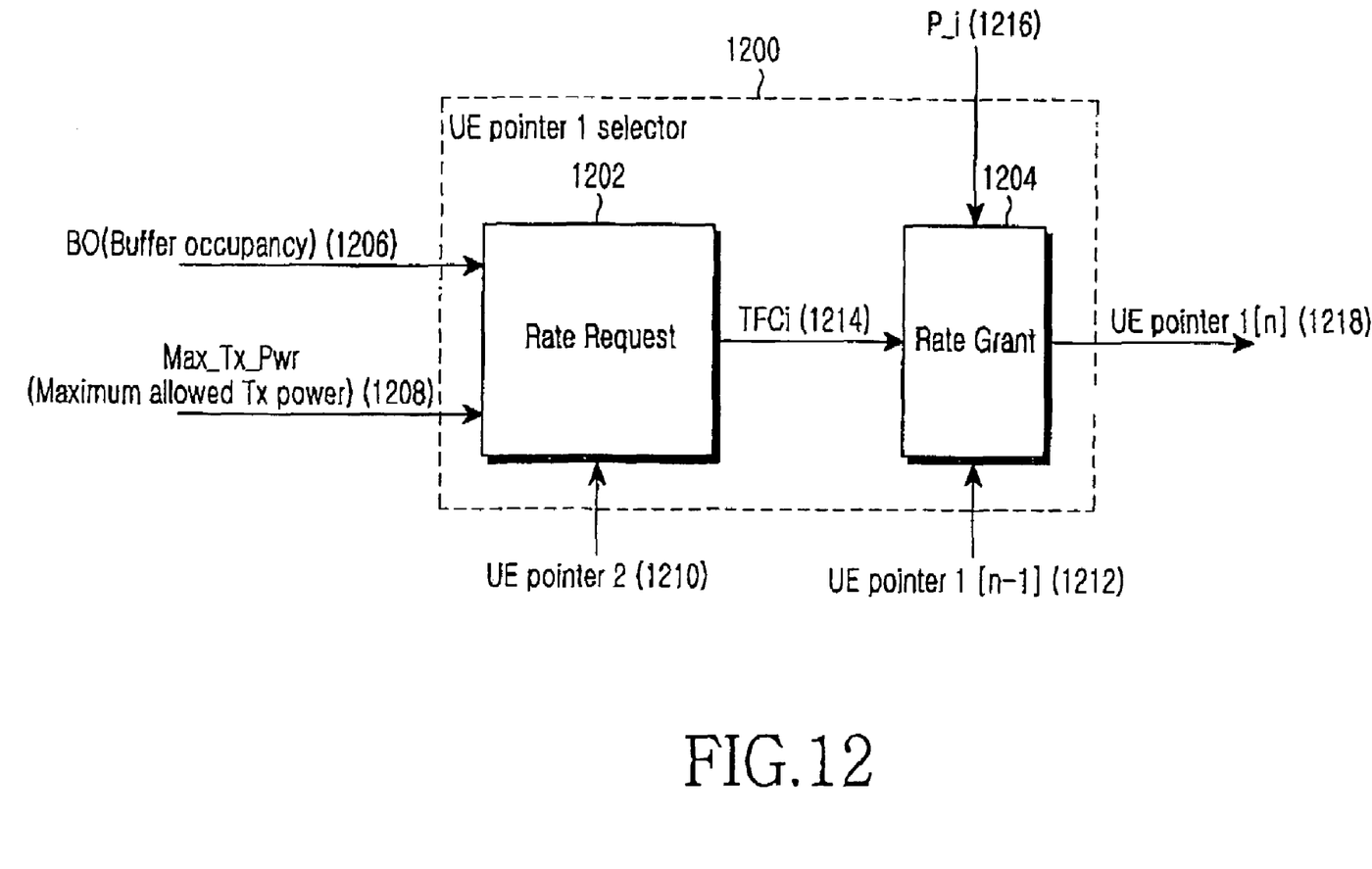
FIG. 12 is a block diagram for illustrating a structure of a UE determining a data rate according to the second embodiment of the present invention.

FIG. 12 is a block diagram showing a construction of a UE pointer 1 selection unit of the UE according to the second embodiment of the present invention.

The UE pointer 1 selection unit 1200 includes a rate request unit 1202 and a rate grant unit 1204. The rate request unit 1202 determines the data rate necessary for the UE and the rate grant unit 1204 detects whether the data rate determined by the rate request unit 1202 is available or not. Hereinafter, the rate request unit 1202 and the rate grant unit 1204 will be discussed.

The rate request unit 1202 receives a Buffer Occupancy (BO) 1206, a maximum allowed transmission power 1208, and the UE pointer 2 (1210) from the Node B, and determines an optimum TFC by means of the received information. In this case, the rate request unit 1202 selects a higher data rate or a TFC of a higher level when the buffer contains large data. However, when the requested data rate exceeds the maximum allowed transmission power 1208 for the UE, the rate request unit 1202 determines the data rate within a range satisfying the condition of the maximum allowed power 1208. Further, the TFC determined in this way is compared with the UE pointer 2 transmitted from the Node B so that the finally selected TFC cannot exceed the range limited by the UE pointer 2. In other words, the rate request unit 1202 determines and outputs the TFCi 1214 in consideration of the buffer occupancy 1206 and the maximum allowed power 1208. The TFC selection proposed above is only one example of various possible methods and can be obviously modified or changed in various ways in its actual application.

The rate grant unit 1204 determines a data rate for the current transmission in consideration of the received TFCi 1214, the UE pointer 1[n-1] 1212 for the previous transmission, and the probability factors P_i 1216 for the TFCs from the Node B. That is, the rate grant unit 1204 outputs the UE pointer 1 (1218).

Here, the rate grant unit 1204 may generate a random variable between 0 and 1 for the determined data rate, i.e., the UE pointer 1 (1218), output the received UE pointer 1[n] 1218 only when the generated random variable is smaller than the received rate grant probability message 1216, and output the previously used UE pointer 1[n-1] intact when the generated random variable is not smaller than the received rate grant probability message 1216.

Figure 13:
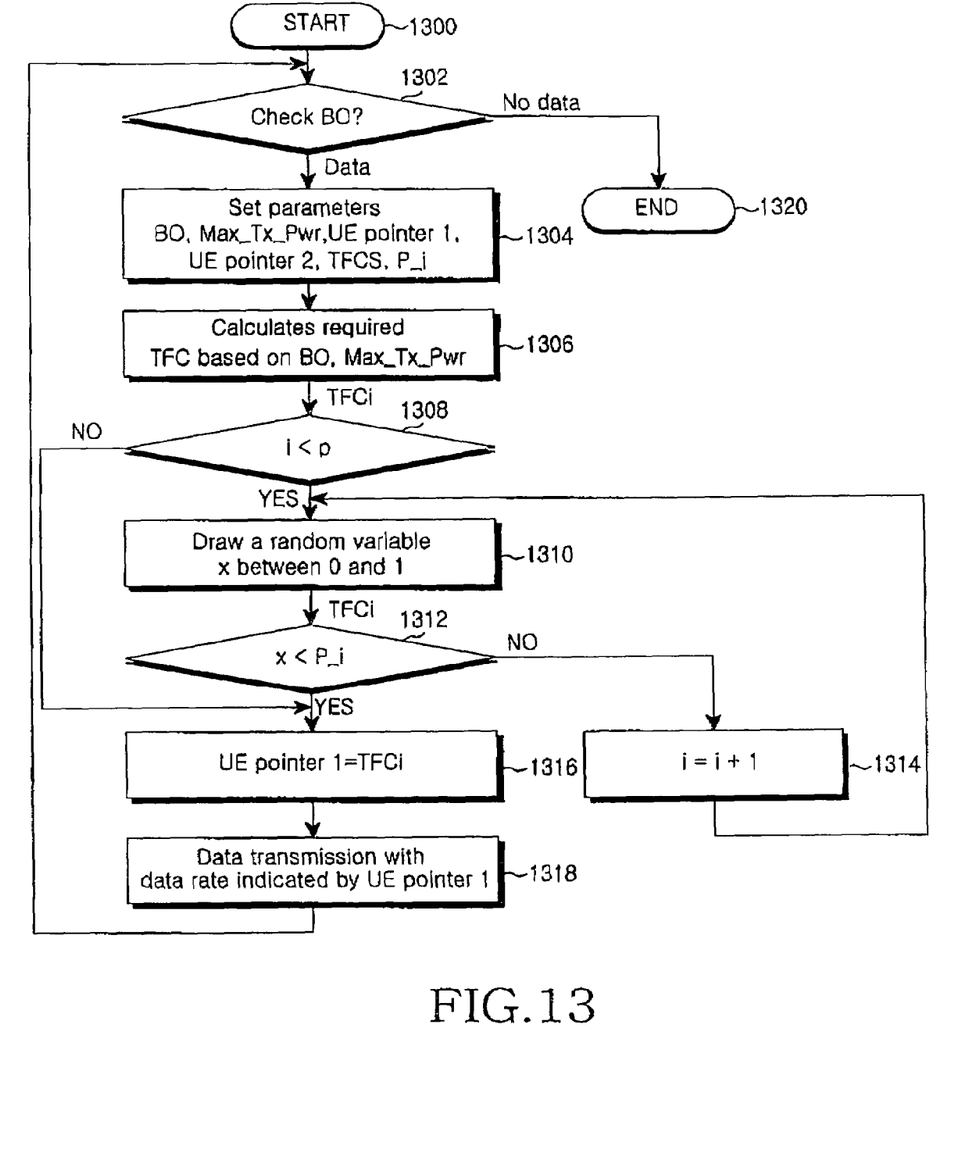
FIG. 13 is a flowchart of an operation of a UE according to the second embodiment of the present invention.

Hereinafter, a process of outputting the UE pointer 1 (1218) at the current time will be described in detail with reference to FIG. 13.

First, in step 1302, the UE checks the buffer occupancy. When the buffer contains data to transmit, the UE proceeds to step 1304. When the buffer contains no data to transmit, the UE proceeds to step 1320 and ends the process. In step 1304, the UE sets the buffer occupancy, the maximum allowed transmission power, the UE pointer 2, the UE pointer 1, TFCS, and P_i. In step 1306, the UE calculates an optimum data rate by means of the buffer occupancy and the maximum allowed transmission power. The calculated data rate is used in selecting a TFC within the range of the UE pointer 2. In FIG. 13, the selected TFC is expressed as TFCi.

In step 1308, the UE compares TFCi with TFCp. TFCp corresponds to the data rate of previous transmission. Step 1310 is performed when TFCp is larger than TFCi and step 1316 is performed when TFCp is smaller than or equal to TFCi. In step 1310, the UE generates a random variable x between 0 and 1 with a uniform generation probability. In step 1312, the UE compares P_i (corresponding to TFCi) with the variable x generated in step 1310. If x is smaller than P_i, step 1316 is performed. If x is larger than or equal to P_i, step 1314 is performed. In step 1314, the UE increases one for the value of i. That is, the UE selects a new TFC of one-step reduced data rate and proceeds to step 1310. In step 1316, the UE determines the UE pointer 1 as TFCi. In step 1318, the UE transmits data at the data rate corresponding to the determined UE pointer 1.

Figure 14:
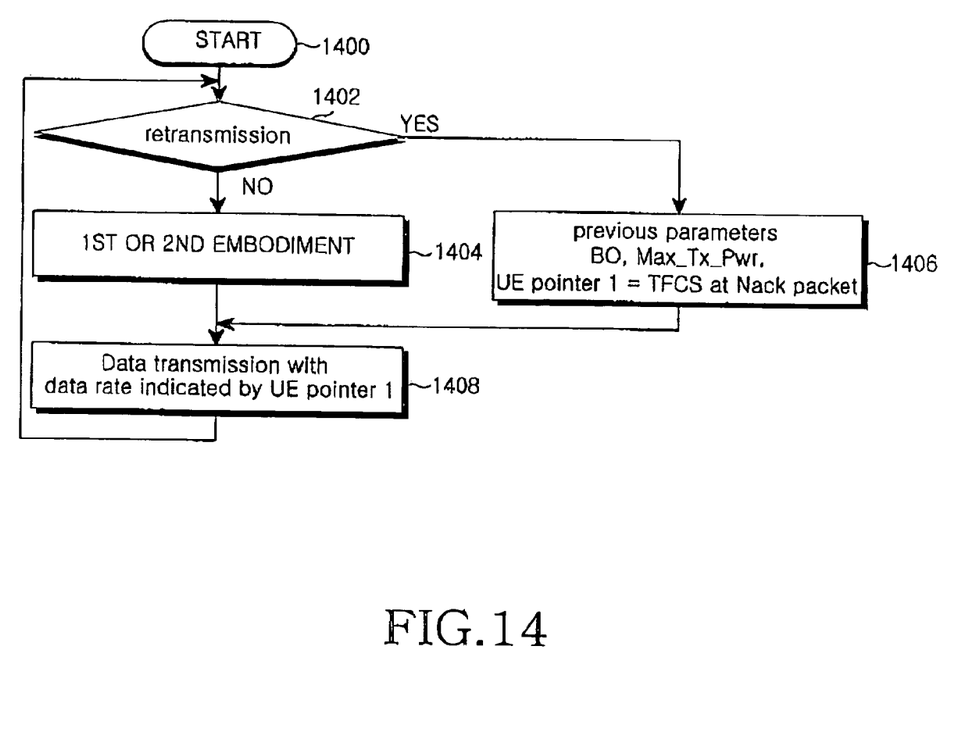
FIG. 14 is a flowchart of an operation of a UE according to a third embodiment of the present invention.

FIG. 14 is a flowchart for illustrating an operation of the UE in response to a request of retransmission according to the third embodiment of the present invention. In step 1402, the UE determines whether to perform the retransmission or not. The UE proceeds to step 1406 if retransmission is necessary and to step 1404 if retransmission is unnecessary. In step 1404, the UE determines the UE pointer 1 through performing the process according to the first or second embodiment of the present invention and then proceeds to step 1408. In step 1406, the UE determines the UE pointer 1 using the TFC corresponding to the data rate of the previous transmission. In step 1408, the UE transmits data stored in the buffer using the determined pointer 1 and then returns to step 1402.

According to the embodiments of the present invention as described above, a UE can determine a data rate for the UE itself, thereby reducing the complexity of the Node B. Further, the determined data rate for the UE is selected within a particular range with reference to a previously used data rate, so that the influence of the interference signal can be reduced.

While the invention has been shown and described with reference to certain embodiments thereof, it should be understood by those skilled in the art that various changes in form and details may be made therein without departing from the spirit and scope of the invention as defined by the appended claims.

What is claimed is:

1. A method for determining a data rate for data transmission from a UE to a Node B in a mobile communication system, the method comprising the steps of:

determining a preliminary data rate in consideration of a quantity of data waiting for transmission;

comparing the preliminary data rate with a previous data rate used for previous data transmission;

outputting a rate request message "UP" when the determined preliminary data rate is higher than the previous data rate, outputting a rate request message "DOWN" when the determined preliminary data rate is lower than the previous data rate, and outputting a rate request message "KEEP" when the determined preliminary data rate is equal to the previous data rate;

setting a UE pointer according to the rate request message; and determining the data rate using a selection probability for grant of the data rate received through a broadcast channel according to a result of the comparing step.

2. A method as claimed in claim 1, wherein the UE receives a control information from the Node B, and the control information includes a Transport Format Combination Set (TFCS) and the selection probability, the TFCS including a plurality of Transport Format Combinations (TFCs) corresponding to available data rates which can be used for the UE.

3. A method as claimed in claim 2, wherein the UE receives control information including only the selection probability from the Node B when an event for traffic load has occurred in the Node B.

4. A method as claimed in claim 3, wherein the UE transmits the data at the preliminary data rate when the preliminary data rate is lower than the previous data rate.

5. A method as claimed in claim 3, further comprising a step of comparing the selection probability with a random variable generated by the UE when the preliminary data rate is higher than or equal to the previous data rate.

6. A method as claimed in claim 5, wherein the UE transmits the data at the preliminary data rate when the random variable generated by the UE is smaller than the selection probability of the data rate transmitted from the Node B.

7. A method as claimed in claim 5, wherein the UE transmits the data at the previous data rate when the random variable generated by the UE is larger than the selection probability of the data rate transmitted from the Node B.

8. A method as claimed in claim 1, wherein the UE receives a control information including a TFCS and an identifier corresponding to a selection probability for grant of the data rate from the Node B.

9. A method as claimed in claim 8, wherein the UE receives control information including only the identifier corresponding to the selection probability when an event for traffic load has occurred in the Node B.

10. A method as claimed in claim 9, further comprising a step of comparing the selection probability corresponding to the identifier with a random variable generated by the UE when the preliminary data rate is higher than or equal to the previous data rate.

11. A method as claimed in claim 10, wherein the UE transmits the data at the preliminary data rate when the random variable generated by the UE is smaller than the selection probability corresponding to the identifier transmitted from the Node B.

12. A method as claimed in claim 10, wherein the UE transmits the data at the previous data rate when the random variable generated by the UE is larger than the selection probability corresponding to the identifier transmitted from the Node B.

13. A system for determining a data rate for data transmission from a UE to a Node B in a mobile communication system, the system comprising:

a UE for determining a preliminary data rate in consideration of a quantity of data waiting for transmission, comparing the preliminary data rate with a previous data rate used for previous data transmission, determining the data rate using a selection probability for grant of the data rate received through a broadcast channel according to a result of the comparing step, outputting a rate request message "UP"when the determined preliminary data rate is higher than the previous data rate, outputting a rate request message "DOWN" when the determined preliminary data rate is lower than the previous data rate, outputting a rate request message "KEEP"when the determined preliminary data rate is equal to the previous data rate, and setting a UE pointer according to the rate request message; and a Node B transmitting the selection probability to the UE.

14. A system as claimed in claim 13, wherein the UE receives a control information from the Node B, and wherein the control information includes a Transport Format Combination Set (TFCS) and the selection probability, the TFCS including a plurality of Transport Format Combinations (TFCs) corresponding to available data rates which can be used for the UE.

15. A system as claimed in claim 14, wherein the UE receives control information including only the selection probability from the Node B when an event for a traffic load has occurred in the Node B after the UE receives the TFCS.

16. A system as claimed in claim 15, wherein the UE transmits the data at the preliminary data rate when the preliminary data rate is lower than the previous data rate.

17. A system as claimed in claim 15, wherein the UE compares the selection probability with a random variable generated by the UE when the preliminary data rate is higher than or equal to the previous data rate.

18. A system as claimed in claim 17, wherein the UE transmits the data at the preliminary data rate when the random variable generated by the UE is smaller than the selection probability of the data rate transmitted from the Node B.

19. A system as claimed in claim 17, wherein the UE transmits the data at the previous data rate when the random variable generated by the UE is larger than the selection probability of the data rate transmitted from the Node B.

20. A system as claimed in claim 13, wherein UE receives control information including a TFCS and an identifier corresponding to a selection probability for grant of the data rate from the Node B.

21. A system as claimed in claim 20, wherein the UE receives a control information including only the identifier corresponding to the selection probability when an event for traffic load has occurred in the Node B.

22. A system as claimed in claim 21, wherein the UE compares the selection probability corresponding to the identifier with a random variable generated by the UE when the preliminary data rate is higher than or equal to the previous data rate.

23. A system as claimed in claim 22, wherein the UE transmits the data at the preliminary data rate when the random variable generated by the UE is smaller than the selection probability corresponding to the identifier transmitted from the Node B.

24. A system as claimed in claim 22, wherein the UE transmits the data at the previous data rate when the random variable generated by the UE is larger than the selection probability corresponding to the identifier transmitted from the Node B.

* * * * *

UNITED STATES PATENT AND TRADEMARK OFFICE
CERTIFICATE OF CORRECTION

PATENT NO.       : 7,596,122 B2                      Page 1 of 1
APPLICATION NO. : 10/983339
DATED            : September 29, 2009
INVENTOR(S)      : Han et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 841 days.

Signed and Sealed this

Fourteenth Day of December, 2010

David J. Kappos
*Director of the United States Patent and Trademark Office*